United States Patent
Zhang et al.

(10) Patent No.: US 7,524,446 B2
(45) Date of Patent: Apr. 28, 2009

(54) METHOD FOR MANUFACTURING A COMPOSITE TIRE OF POLYURETHANE TREAD AND RADIAL CARCASE

(75) Inventors: Hai Zhang, Guangzhou (CN); Tie-Jun Ma, Guangzhou (CN); Yan-Ping Ye, Guangzhou (CN); Yu-Hua Yi, Guangzhou (CN); Jian-Rong Shen, Guangzhou (CN); Jun Li, Guangzhou (CN)

(73) Assignee: Hangzhou Hanma Tyre Technology Ltd., Hangzhou, Zhejiang (CN)

( * ) Notice: Subject to any disclaimer, the term of this patent is extended or adjusted under 35 U.S.C. 154(b) by 938 days.

(21) Appl. No.: 10/875,672

(22) Filed: Jun. 23, 2004

(65) Prior Publication Data

US 2005/0092424 A1 May 5, 2005

(30) Foreign Application Priority Data

Oct. 31, 2003 (CN) .................. 2003 1 01119791

(51) Int. Cl.
*B29C 39/10* (2006.01)

(52) U.S. Cl. .................. 264/135; 264/265; 264/275; 264/DIG. 77

(58) Field of Classification Search ................ None
See application file for complete search history.

(56) References Cited

U.S. PATENT DOCUMENTS

| 4,006,767 | A | * | 2/1977 | Ford | ............. | 152/452 |
| 4,544,427 | A | * | 10/1985 | Hausch | ............. | 156/97 |
| 4,669,517 | A | * | 6/1987 | Krishnan | ............. | 152/209.5 |
| 4,704,176 | A | * | 11/1987 | Botzman | ............. | 156/125 |
| 4,942,093 | A | * | 7/1990 | Lawson | ............. | 428/423.3 |

FOREIGN PATENT DOCUMENTS

JP            2005132093        * 5/2005

* cited by examiner

*Primary Examiner*—Edmund H. Lee
(74) *Attorney, Agent, or Firm*—patenttm.us

(57) ABSTRACT

Methods for manufacturing a composite rubber tire with a polyurethane tread comprise: treating an outer surface of an internal rubber body; preparing a polyurethane pre-polymer; improving the polyurethane pre-polymer; and applying the polyurethane pre-polymer to the treated outer surface of the internal rubber body to mold a polyurethane tread. Thereby, the composite rubber tire with the polyurethane tread is achieved and has excellent characteristics such as low rolling resistance, low oil consumption, excellent durability and low environmental contamination. Additionally, the methods constitute simple manufacturing processes that reduce manufacturing costs of the composite rubber tire with the polyurethane tread.

10 Claims, No Drawings

METHOD FOR MANUFACTURING A COMPOSITE TIRE OF POLYURETHANE TREAD AND RADIAL CARCASE

BACKGROUND OF THE INVENTION

1. Field of the Invention

The present invention relates to a method for manufacturing a composite rubber tire, and more particularly to a composite rubber tire that has a polyurethane tread to achieve an environmentally friendly tire with excellent mechanical efficiency.

2. Description of Related Technology

Environmentally friendly tires mostly refer to radial tires that have less rolling resistance to reduce vehicles fuel consumption and exhaust, and to reduce the waste gas ejected. By using environmentally friendly tires, rolling resistance is reduced by 22-25%, and fuel consumption is reduced by 3-8%. Therefore, research into environmentally friendly tires is a popular subject for tire manufacturers worldwide.

Environmentally friendly tires have been developed for decades and are basically classified into two types: natural rubber radial tires and molded polyurethane tires. Natural rubber radial tires have an internal body and an outer surrounding layer. The internal body and the outer layer are made of natural rubber. The natural rubber radial tires have excellent kinetic properties such as low heat generation and good flexibility and are suitable for use as high-speed tires. Natural rubber radial tires usually are coated with an improving glue on the outer surface to reduce the rolling resistance and to strengthen the tires. Current third generation radial tires have a rolling resistance 30% less than first generation radial tires. However, nature rubber tires still have the following drawbacks:

1. Natural rubber radial tires do not have good wear-resistance. Although an improving glue is applied to the outer surface of natural rubber radial tires to reduce rolling resistance, the improving glue reduces the wear-resistance. Therefore, the natural rubber radial tires are not durable and must be replaced and discarded often, which causes more trash problems. Additionally, abrasion of the natural rubber radial tires also causes environmental problems such as releasing metal particles into the air. For example, dust beside highways contains 42 times the zinc contamination, 28 times the copper contamination, 19 times the chromium contamination and 8 times the lead contamination than in parks.

2. Because natural rubber radial tires are less durable, the improving glue contains carbon black and carcinogenic aromatic oil to enhance the durability. Both additives are released into the environment and cause more pollution.

Therefore, the natural rubber radial tires are not actually environmentally friendly. With increasing attention to environmental protection, manufacturers have started to focus on using non-pollutants and apply a new improving glue on the tire to reduce rolling resistance. Furthermore, the manufacturers also want to increase the wear-resistance of the tire to improve tire durability to reduce the quantity of waste tires and to reduce heavy metal pollutants released into the environment.

Molded polyurethane tires have an internal body and an outer surrounding layer. The internal body and the outer layer are made of polyurethane.

The polyurethane tire has excellent wear-resistance that makes the tire durable and overcomes the problem of an excessive number of discarded tires. Furthermore, the polyurethane tire is very strong and does not need either carbon black or aromatic oil as additives. Therefore, the polyurethane tire has no environmental problems caused by the additives.

However, the polyurethane tire still has the following drawbacks.

1. The polyurethane tire is very hard and has less flexibility than the nature rubber tire and poor kinetic properties. Therefore, the polyurethane tires have high rolling resistance that causes excessive heat in the tires and the engine, which causes increased oil consumption in the engine, and polyurethane tires are not suitable for use as high-speed tires.

2. Furthermore, the polyurethane tire has several complex manufacturing problems such as a complex core mold structure, location of a rim, preparation of a reinforcing fabric and location of the reinforcing fabric that increase operating cost of the polyurethane tire.

The present invention has arisen to mitigate or obviate the disadvantages of the conventional environmental friendly tire.

SUMMARY OF THE INVENTION

The main objective of the present invention is to provide a method for manufacturing a composite rubber tire with a polyurethane tread.

The another main objective of the present invention is to provide a composite rubber tire with a polyurethane tread that has excellent flexibility, low rolling-resistance, high oil-saving efficiency and excellent durability.

Further benefits and advantages of the present invention will become apparent after a careful reading of the detailed description.

DETAILED DESCRIPTION OF THE PREFERRED EMBODIMENT

A method for preparing a composite rubber tire with a polyurethane tread in accordance with the present invention where the composite rubber tire has an internal rubber body with an outer surface and a polyurethane tread comprises the following acts:

(1). treating the outer surface of the internal rubber body;
(2). preparing a polyurethane pre-polymer;
(3). improving the polyurethane pre-polymer; and
(4). applying the polyurethane pre-polymer to the treated outer surface of the internal rubber body to mold a polyurethane tread.

In the act of treating the outer surface of the internal rubber body (1), the internal rubber body is optionally a radial rubber tire or a bias-ply rubber tire to serve as a radial carcass and has an intermediate glue layer. The intermediate glue layer is laminated on the outer surface of the internal rubber body when the internal rubber body is molded. Then, the intermediate glue layer is vulcanized and trimmed at surfaces to be coated with the polyurethane pre-polymer.

In the act of preparing a polyurethane pre-polymer (2), the polyurethane pre-polymer is made in a "low polymerized polyol and isocyanate" system, which indicates the pre-polymer is synthesized by low polymerized polyol and isocyanate. The "low polymerized polyol and isocyanate" system is selected from a system A or a system B.

System A is a "polytetramethylene glycol and 1,5-naphalene diisocyanate" system. The polytetramethylene glycol has a molecular weight of 1000 to 3000. A chain-extending agent is a low molecular diol and has a chain-extending coefficient of 0.95 to 0.98.

System B is a "hydroxyl-terminated polybutadiene and 4,4'-diphenylmethane diisocyanate" system. The hydroxyl-terminated polybutadiene has a molecular weight of 1000 to 2000. A chain-extending agent is a low molecular diol and has a chain-extending coefficient of 0.95 to 0.98.

In the act of preparing a polyurethane pre-polymer (2), the low polymerized polyol is held in a −0.095 to −0.098 Mpa vacuum atmosphere to dehydrate at 120 to 140° C. for 2 to 3 hours and then cools down to 60° C. Isocyanate is then added to the low polymerized polyol to react in a −0.095 to −0.098 Mpa vacuum atmosphere at 70 to 80° C. for 1 to 2 hours to achieve the polyurethane pre-polymer. The quantity of isocyanate is controlled to make the isocyanate group content 5.0 to 6.0 percent of the total polyurethane pre-polymer. Wherein, the quantity detection of isycyanate is popular in stoichiometry and redundant description is obviated here.

The act of improving the polyurethane pre-polymer (3) modifies the polyurethane pre-polymer by treating the polyurethane pre-polymer with surface-treated nano-$SiO_2$ particles. Nano-$SiO_2$ particles 10 to 40 nm in diameter are activated by heating and mixed well with an ethanol solution containing a silane coupling agent. The silane coupling agent in the ethanol solution is 30 to 50 wt % of the weight of nano-$SiO_2$ particles. The ethanol solution is 3 to 5 times the silane coupling agent. The mixture is heated to 220 to 240° C. and dried for 4 to 6 hours under a −0.095 to −0.098 Mpa vacuum atmosphere in a vacuum drier to obtain a solid. The solid is cooled and pulverized to obtain surface-treated nano-$SiO_2$ particles. The surface-treated nano-$SiO_2$ particles are dispersed in the polyurethane pre-polymer by a high power supersonic dispersing machine to obtain modified polyurethane pre-polymer. The surface treated nano-$SiO_2$ particles are 1 to 3 wt % based on the weight of the polyurethane pre-polymer.

In the act of applying the polyurethane pre-polymer to the treated outer surface of the internal rubber body to mold a polyurethane tread(4), the modified polyurethane pre-polymer is placed in a container A on a molding machine, heated to 70 to 82° C. in a −0.095 to −0.098 Mpa vacuum atmosphere and held still for 15 to 30 minutes to eliminate bubbles. The low molecular diol of the chain-extending agent is placed in a container B on the molding machine. The amounts of the polyurethane pre-polymer and the chain-extending agent are calculated by setting the chain-extending coefficient and the isocyanate group content. A pump connected to containers A and B draws proper amounts of the polyurethane pre-polymer and the low molecular diol from containers A and B.

The treated internal rubber body is placed into a mold and pre-heated to 110 to 130° C. Then, the molding machine pours the polyurethane pre-polymer and the chain-extending agent into the mold. The mold is kept at a pressure of 0.2-0.3 Mpa and a temperature of 110 to 130° C. After 30 to 80 minutes, the internal rubber body coated with the polyurethane tread is detached from the mold and placed in an oven to heat at 110 to 130° C. for 12 to 24 hours to obtain a composite rubber tire with a polyurethane tread.

Alternately, the act of treating the outer surface of the internal rubber body (1) can be performed by treating the trimmed outer surface of the internal rubber body with a polyisocyanate surfactant. The trimmed outer surface is sprayed or coated with the polyisocyanate surfactant 1 to 8 hours before the act of applying the polyurethane pre-polymer (4) for molding.

Alternately, the act of improving the polyurethane pre-polymer (3) can be achieved by modifying the polyurethane pre-polymer with nano-particles of carbon white. The nano-particles of carbon white are 1 to 40 nm in diameter. A preferred diameter of the nano-particles of carbon white is 15 to 25 nm. The nano-particles of carbon white are activated by heating and mixed well with a toluene solvent containing polyisocyanateat at 80 ° C. for 1 to 2 hours. The polyisocyanate in the toluene solvent is 50 to 60 wt % based on the weight of nano-particles of carbon white. The toluene solution is 3 to 5 times the polyisocyanate. The toluene solvent is removed from the mixture by vacuum suction at −0.095 to −0.098 Mpa at 220 to 240° C. Then, the mixture is dried for 4 to 6 hours, cooled and pulverized to obtain surface-treated nano-particles of carbon white. The surface-treated nano-particles of carbon white are dispersed in the polyurethane pre-polymer by a high power supersonic dispersing machine to obtain modified polyurethane pre-polymer. The surface treated nano-particles of carbon white is 1 to 3 wt % based on the weight of the polyurethane pre-polymer.

Additionally, the low molecular diol in the act of preparing a polyurethane pre-polymer (2) is selected from the group comprising: glycol, 1,4-butylene diol, and hydroquinone-bi (β-hydroxylethyl) ether.

To further clarify the method, several operational examples follow.

EXAMPLE 1

Step 1: Treating an Outer Surface of an Internal Rubber Body:

An intermediate glue layer was attached to the outer surface of the internal rubber body. Then, the internal rubber body was vulcanized, trimmed at surfaces to which the polyurethane tread is applied and molded with the polyurethane tread.

Step 2: Preparing and Improving a Polyurethane Pre-Polymer:

In this example, a "hydroxyl-terminated polybutadiene and 4,4'-diphenylmethane diisocyanate" system was prepared and nano-$SiO_2$ particles were used to modify the polyurethane pre-polymer. 100 PHR(Per-Hundred Resin) of hydroxyl-terminated polybutadiene with a molecular weight of 2000 was input into a reacting chamber, heated to 120 to 130° C. until the hydroxyl-terminated polybutadiene melted and stirred in a vacuum of −0.095 to −0.098 Mpa for 2 to 2.5 hours to dehydrate. Then, the hydroxyl-terminated polybutadiene was cooled to 60° C., mixed well with 33 PHR of 4,4'-diphenylmethane diisocyanate, stirred and heated to 80°±2° C. for 2 hours to obtain the polyurethane pre-polymer.

3 PHR of nano-SiO2 particles with a diameter of 10 to 25 nm diameter, 0.5 PHR of benzoamido propyl triethoxyl silane (trade name:ND-42) as a silane coupling agent and 2.0 PHR of ethanol solvent were input into a high-speed mixer and stirred for 8 minutes to form a mixture. The mixture was placed in a vacuum drier at 220 to 230° C. and dehydrated for 4 to 5 hours under a −0.095 to −0.098 Mpa vacuum atmosphere to become solid. The solid was cooled and pulverized to obtain surface-treated nano-$SiO_2$ particles.

The surface-treated nano-$SiO_2$ particles were mixed well with the polyurethane pre-polymer by a high power supersonic dispersing machine to achieve the modified polyurethane pre-polymer.

Step 3: Molding a Polyurethane Tread on the Internal Rubber Body:

The modified polyurethane pre-polymer was placed in a container A on a molding machine, heated to 80° C. in a −0.095 to −0.098 Mpa vacuum atmosphere and held still for 10 to 15 minutes to eliminate bubbles. The chain-extending agent of 1,4-butylene diol was placed in a container B on the molding machine. The amounts of the polyurethane pre-polymer and the chain-extending agent are calculated by setting the chain-extending coefficient to 0.95.

When the isocyanate group content is 5.0%, amounts of the modified polyurethane pre-polymer and the chain-extending agent are calculated by setting the chain-extending coefficient and the isocyanate group content in accordance with the following formula:

$$QCE = WPP \times IGC \times CtCE \times CtCE,$$

wherein, QCE is the amount of chain-extending agent; WPP is the weight of the polyurethane pre-polymer; IGC is the isocyanate group content; CtCE is the constant of the chain-extending agent; and CoCE is the coefficient of the chain-extending agent.

The amount of the chain-extending agent for 100 PHR of polyurethane pre-polymer is calculated according to the formula:

$$B = 0.05 \times 1.07 \times 0.95 \times 100 = 5.08$$

wherein, 1.07 is a constant of using 1,4-butylene diol as the chain-extending agent.

According to the formula, 5.08 PHR of 1,4-butylene diol has to be added to the 100 PHR polyurethane pre-polymer. Therefore, the pump connected to containers A and B was adjusted to prepare correct amounts of the polyurethane pre-polymer and 1,4-butylene diol.

The treated internal rubber body with the intermediate glue layer was placed into a mold in a molding machine and pre-heated to 110° C. Then, the molding machine poured the polyurethane pre-polymer and the 1,4-butylene diol into the mold. The mold was kept at a pressure of 0.2-0.3 Mpa and a temperature of 110° C. After 60 to 80 minutes, the internal rubber body coated with the polyurethane tread was detached from the mold and placed in an oven to heat at 110° C. for 24 hours to obtain a composite rubber tire with a polyurethane tread.

EXAMPLE 2

Step 1: Treating an Outer Surface of an Internal Rubber Body:

A rubber radial tire was placed on a rotatable rack, trimmed at surfaces to which the polyurethane tread is applied and coated with polyisocyanate surfactant for 1.5 hours before coating with the polyurethane tread. However, the rubber radial tire has to be coated with the polyurethane pre-polymer within 12 hours of applying the polyisocyanate surfactant and cannot be contaminated by water or dust on surfaces to which the polyurethane tread is to be applied.

Step 2: Preparing and Improving a Polyurethane Pre-Polymer:

In this example, a "polytetramethylene glycol and 1,5-naphalene diisocyanate" system was used and nano-particles of carbon white were used in this system to modify the polyurethane pre-polymer.

2 PHR of nano-particles of carbon white with a diameter of 15 to 25 nm was heated to 250° C. for 6 hours. 1.5 PHR of 1,5-naphalene diisocyanate was dissolved in 4.5 PHR of dry toluene solution and heated to 80°±2° C. for 1.5 hour to form a mixture. The mixture was dried in a vacuum drier at 230 to 240° C. for 5 to 6 hours in a −0.095 to −0.098 Mpa vacuum atmosphere to obtain a solid. The solid was cooled and pulverized to obtain surface-treated nano-particles of carbon white.

100 PHR of polytetramethylene glycol with a molecular weight of 1500 was input into a reacting chamber, heated to 120 to 130° C. in a −0.095 to −0.098 Mpa vacuum atmosphere for 1 to 2 hours to dehydrate. Then, the polytetramethylene glycolpolytetramethylene glycol was cooled to 60° C., mixed well with 30 PHR of 1,5-naphalene diisocyanate, stirred and heated to 80°±2° C. for 2 hours to obtain the polyurethane pre-polymer.

The nano-particles of carbon white were mixed well with the polyurethane pre-polymer by a high power supersonic dispersing machine to obtain the modified polyurethane pre-polymer.

Step 3: Molding a Polyurethane Tread on the Internal Rubber Body:

The modified polyurethane pre-polymer was placed in a container A on a molding machine, heated to 70 to 80° C. in a −0.095 to −0.098 Mpa vacuum atmosphere and held still for 15 to 30 minutes to eliminate bubbles. The chain-extending agent of glycol was placed in a container B on the molding machine. Amounts of the polyurethane pre-polymer and the chain-extending agent are calculated by setting the chain-extending coefficient of glycol to 0.98. The constant for glycol in the foregoing calculation formula is 0.738. Therefore, the pump connected to containers A and B was adjusted to prepare correct amounts of the polyurethane pre-polymer and glycol.

The treated rubber radial tire with the polyisocyanate surfactant was placed into a mold in a molding machine and pre-heated to 120 to 125° C. Then, the molding machine poured the polyurethane pre-polymer and the glycol into the mold. The mold was kept at a pressure of 0.2-0.3 Mpa and a temperature of 120 to 125° C. After 40 to 60 minutes, the rubber radial tire coated with a layer of polyurethane tread was detached from the mold and placed in an oven to heat at 120 to 125° C. for 16 hours to obtain a composite rubber tire with a polyurethane tread.

EXAMPLE 3

Step 1: Treating an Outer Surface of an Internal Rubber Body:

An intermediate glue layer was attached to the outer surface of the internal rubber body. Then, the internal rubber body was vulcanized, trimmed at surfaces to which the polyurethane tread was to be applied.

Step 2: Preparing and Improving a Polyurethane Pre-Polymer:

In this example, a "polyether polyol and polyester polyol" system was used and nano-$SiO_2$ particles were used in this system to modify the polyurethane pre-polymer.

A mixture of 50 PHR of polytetramethylene glycolpolytetramethylene glycol with a molecular weight of 2000 and 50 PHR of hydroxyl-terminated polybutadiene with a molecular weight of 2000 were input into a reacting chamber, heated to 125 to 135° C. to melt and stirred in a −0.095 to −0.098 Mpa vacuum atmosphere for 2.5 to 3 hours to dehydrate. Then, the mixture was cooled below 60° C., mixed well with 35 PHR of 4,4'-diphenylmethane diisocyanate, stirred and heated to 80°±2° C. for 1.5 to 2 hours to obtain the polyurethane pre-polymer. After cooling, a sample of the polyurethane pre-polymer was tested to determine the isocyanate group content.

2 PHR of nano-$SiO_2$ particles, 0.5 PHR of N-(β-ethylamino)-γ-propylamino trimethoxy silane (trade name:ND-52) and 2 PHR of 95% ethanol solvent were input into a high-speed mixer and stirred for 5 minutes to form a mixture. The mixture was dried in a vacuum drier at 225 to 235° C. for 4.5 to 5.5 hours in a −0.095 to −0.098 Mpa vacuum atmosphere to obtain a solid. The solid was cooled and pulverized to obtain surface-treated nano-$SiO_2$ particles.

The surface-treated nano-SiO$_2$ particles were mixed well with the polyurethane pre-polymer by a high power supersonic dispersing machine to obtain modified polyurethane pre-polymer.

Step 3: Molding a Polyurethane Tread on the Internal Rubber Body:

The modified polyurethane pre-polymer was placed in a container A on a molding machine, heated to 70° C. in a −0.095 to −0.098 Mpa vacuum atmosphere and held still for 15 to 30 minutes to eliminate bubbles. The chain-extending agent of glycol was placed into a container B on the molding machine. Amounts of the polyurethane pre-polymer and the chain-extending agent were calculated by setting the chain-extending coefficient of glycol to 0.96. The constant of glycol in the foregoing calculation formula is 0.738. Therefore, the pump connected to containers A and B was adjusted to prepare correct amounts of the polyurethane pre-polymer and glycol.

The treated internal rubber body with the intermediate glue layer was placed into a mold in a molding machine and pre-heated to 120° C. Then, the molding machine poured the polyurethane pre-polymer and glycol into the mold. The mold was kept at a pressure of 0.2-0.3 Mpa and a temperature of 120° C. After 60 minutes, the internal rubber body coated with a polyurethane tread was detached from the mold and placed in an oven to heat at 120° C. for 16 hours to obtain a composite rubber tire with a polyurethane tread.

EXAMPLE 4

Step 1: Treating an Outer Surface of an Internal Rubber Body:

A rubber radial tire was placed on a rotatable rack, trimmed at surfaces to which the polyurethane tread was to be applied and coated with polyisocyanate surfactant 7.5 hours before the polyurethane tread was applied.

Step 2: Preparing and Improving a Polyurethane Pre-Polymer:

In this example, a "hydroxyl-terminated polybutadiene and 4,4'-diphenylmethane diisocyanate" system was used and nano-SiO$_2$ particles were used in this system to modify the polyurethane pre-polymer.

100 PHR of hydroxyl-terminated polybutadiene with a molecular weight of 1000 was input into a reacting chamber, heated to 128 to 132° C. to melt and stirred in a −0.095 to −0.098 Mpa vacuum atmosphere for 2.5 hours to dehydrate. Then, the mixture was cooled below 60° C., mixed well with 48 PHR of 4,4'-diphenylmethane diisocyanate, stirred and heated to 73° C. for 2 hours to obtain the polyurethane pre-polymer. After cooling, a sample of the polyurethane pre-polymer was tested to determine the isocyanate group content.

2 PHR of nano-SiO$_2$ particles in size of 12 to 25 nm, 0.5 PHR of N-(β-ethylamino)-γ-propylamino trimethoxy silane (trade name:WD-52), and 2 PHR of 95% ethanol solvent were input into a high-speed mixer and stirred for 5 minutes to form a mixture. The mixture was dried in a vacuum drier at 227 to 233° C. for 5 hours in a −0.095 to −0.098 Mpa vacuum atmosphere to obtain a solid. The solid was cooled and pulverized to obtain surface-treated nano-SiO$_2$ particles.

The surface-treated nano-SiO$_2$ particles were mixed well with the polyurethane pre-polymer by a high power supersonic dispersing machine to obtain modified polyurethane pre-polymer.

Step 3: Molding a Polyurethane Tread on the Internal Rubber Body:

The modified polyurethane pre-polymer was placed in a container A on a molding machine, heated to 80° C. in a −0.095 to −0.098 Mpa vacuum atmosphere and held still for 20 minutes to eliminate bubbles. The chain-extending agent of 1,4-butylene diol was placed in a container B on the molding machine. Amounts of the polyurethane pre-polymer and the chain-extending agent were calculated by setting the chain-extending coefficient of 1,4-butylene diol to 0.97. Therefore, the pump connected to containers A and B was adjusted to prepare correct amounts of the polyurethane pre-polymer and 1,4-butylene diol.

The treated radial rubber tire with the intermediate glue layer was placed into a mold in a molding machine and pre-heated to 110° C. Then, the molding machine poured the polyurethane pre-polymer and 1,4-butylene diol into the mold. The mold was kept at a pressure of 0.2-0.3 Mpa and a temperature of 120° C. After 60 minutes, the radial rubber tire coated with a layer of polyurethane tread was detached from the mold and placed in an oven to heat at 120° C. for 16 hours to obtain a composite rubber tire with a polyurethane tread.

EXAMPLE 5

Step 1: Treating an Outer Surface of an Internal Rubber Body:

The internal rubber body was placed on a rotatable rack, trimmed at surfaces to which the polyurethane tread was to be applied and coated with a polyisocyanate surfactant by spraying or coating. After coating in 4 hours, the polyurethane tread was molded to the internal rubber body.

Step 2: Preparing a Polyurethane Pre-Polymer:

In this example, a purchased pre-polymer brand named Adiprene 8045 was obtained (purchased from Uniroyal company) and nano-particles of carbon white were used in this system to modify the pre-polymer.

2 PHR of nano-particles of carbon white was heated at 250° C. for 6 hours in a nitrogen atmosphere. 1.5 PHR of toluene diisocyanate was dissolved in 4.5 PHR of dry toluene solvent and heated to 80° C. for 1.5 hours to form a mixture. The mixture was dried in a vacuum drier at 222 to 226° C. for 4.5 to 5.5 hours in a −0.095 to −0.098 Mpa vacuum atmosphere to obtain a solid. The solid was cooled and pulverized to obtain surface-treated nano-particles of carbon white.

100 PHR of Adiprene 8045 was input into a reacting chamber in a nitrogen atmosphere, heated to 80° C. and mixed well with 2 PHR surface-treated nano-particles of carbon white by stirring for 1 to 2 hours. After cooling, a sample of the pre-polymer was tested to determine the isocyanate group content and preserved in nitrogen gas.

Step 3: Molding a Polyurethane Tread on the Internal Rubber Body:

The modified polyurethane pre-polymer was placed in a container A on a molding machine, heated to 80° C. in a −0.095 to −0.098 Mpa vacuum atmosphere and held still for 15 to 30 minutes to eliminate bubbles. The chain-extending agent of 1,4-butylene diol was placed into a container B on the molding machine. Amounts of the polyurethane pre-polymer and the chain-extending agent were calculated by setting the chain-extending coefficient of glycol to 0.97. Therefore, the pump connected to containers A and B was adjusted to prepare correct amounts of the polyurethane pre-polymer and 1,4-butylene diol.

The treated internal rubber body with polyisocyanate surfactant was placed into a mold in a molding machine and pre-heated to 127° C. Then, the molding machine poured the polyurethane pre-polymer and the 1,4-butylene diol into the mold. The mold was kept at a pressure of 0.2-0.3 Mpa and a temperature of 120 to 125° C. After 60 minutes, the internal rubber body coated with a layer of polyurethane tread was detached from the mold and placed into an oven to heat at 120 to 125° C. for 16 hours to obtain a composite rubber tire with a polyurethane tread.

EXAMPLE 6

Step 1: Treating an Outer Surface of an Internal Rubber Body:

An intermediate glue layer was attached to the outer periphery of the internal rubber body. Then, the internal rubber body was vulcanized, trimmed at surfaces to which the polyurethane tread was to be molded.

Step 2: Preparing a Polyurethane Pre-Polymer:

In this example, a hydroxyl-terminated polybutadiene and 4,4'-diphenylmethane diisocyanate system was used and nano-particles of carbon white were used in this system to modify the polyurethane pre-polymer.

100 PHR of hydroxyl-terminated polybutadiene was input into a reacting chamber, heated to 120 to 130° C. to melt and stirred in a −0.095 to −0.098 Mpa vacuum atmosphere for 2 to 2.5 hours. Then, the hydroxyl-terminated polybutadiene was cooled below 60° C. and mixed well with 33 PHR of 4,4'-diphenylmethane diisocyanate. The mixture of the hydroxyl-terminated polybutadiene and 4,4'-diphenylmethane diisocyanate was heated to 80°±2° C. and stirred for 2 hours to obtain the polyurethane pre-polymer.

2 PHR of nano-particles of carbon white with a diameter of 26 to 38 nm was heated at 250° C. for 6 hours in a nitrogen atmosphere. 1.5 PHR of 4,4'-diphenylmethane diisocyanate was dissolved in 4.5 PHR of a dry toluene solvent and heated to 80° C. for 1.5 hour to form a mixture. The mixture was dried in a vacuum drier at 230 to 240° C. for 5 to 6 hours in a −0.095 to −0.098 Mpa vacuum atmosphere to obtain a solid. The solid was cooled and pulverized to obtain surface-treated nano-particles of carbon white.

The surface-treated nano-particles of carbon white are dispersed in the polyurethane pre-polymer by a high power supersonic dispersing machine to obtain the modified polyurethane pre-polymer.

Step 3: Molding a Polyurethane Tread on the Internal Rubber Body:

The modified polyurethane pre-polymer was transported into a container A on a molding machine, heated to 80° C. in a −0.095 to −0.098 Mpa vacuum atmosphere and held still for 20 minutes to eliminate bubbles. The chain-extending agent of 1,4-butylene diol was placed into a container B on the molding machine. Amounts of the polyurethane pre-polymer and the chain-extending agent were calculated by setting the chain-extending coefficient of 1,4-butylene diol to 0.97. Therefore, the pump connected to containers A and B was adjusted to prepare correct amounts of the polyurethane pre-polymer and 1,4-butylene diol.

The treated internal rubber body was placed into a mold in a molding machine and pre-heated to 110° C. Then, the molding machine poured the polyurethane pre-polymer and the 1,4-butylene diol into the mold. The mold was kept at a pressure of 0.2-0.3 Mpa and a temperature of 120° C. After 60 minutes, the internal rubber body coated with a layer of polyurethane tread was detached from the mold and placed into an oven to heat at 120° C. for 16 hours to obtain a composite rubber tire with a polyurethane tread.

The composite rubber tire with a polyurethane tread has the following advantages.

1. The composite rubber tire having the polyurethane tread has both the advantages of the radial rubber tire and the polyurethane elastomer tire. Specifically, the composite rubber tire has low resistance that reduces oil consumption, is durable and causes less environmental contamination.

2. The intermediate glue layer laminated between the internal rubber body and the polyurethane tread cross-links with both the internal rubber body and the polyurethane tread. Therefore, the composite rubber tire does not use an adhesive and has excellent combining strength. Furthermore, the intermediate glue layer can be formed on the internal rubber body when the internal rubber body is molded. Manufacturing the composite rubber tire with the polyurethane tread is simplified. The polyisocyanate surfactant also has the same cross-linking effect to the internal rubber body and the polyurethane tread as the intermediate glue layer.

3. The composite rubber tires made with system A and system B have excellent hardness over 85 to 95 Shore A and excellent flexibility having a rebounding rate over 65%. Additionally, the composite rubber tires also have other good kinetic features such as excellent wear-resistance, low heat generation, less oil-consumption, etc.

4. Using the nano-particles of carbon white to modify the polyurethane pre-polymer decreases the thermal-aging at high temperatures.

Although the invention has been explained in relation to its preferred embodiment, many other possible modifications and variations can be made without departing from the spirit and scope of the invention as hereinafter claimed.

What is claimed is:

1. A method for manufacturing a composite rubber tire with a polyurethane tread where the composite rubber tire has an internal rubber body with an outer surface and a polyurethane tread, the method comprising acts of:

treating the outer surface of the internal rubber body, wherein the internal rubber body is coated with an intermediate glue layer on the outer surface of the internal rubber body when the internal rubber body is molded; the intermediate glue layer is vulcanized and trimmed at surfaces to be coated with the polyurethane tread;

preparing a polyurethane pre-polymer, wherein the polyurethane pre-polymer is made from a low polymerized polyol and isocyanate system selected from system A or system B, wherein system A is a polytetramethylene glycolpolytetramethylene glycol and 1,5-naphalene diisocyanate system and has a low molecular agent serving as a chain-extending agent, wherein, the polytetramethylene glycolpolytetramethylene glycol has a molecular weight of 1000 to 3000 and the chain-extending agent has a chain-extending coefficient of 0.95 to 0.98; and system B is a hydroxyl-terminated polybutadiene and 4,4'-diphenylmethane diisocyanate system and has a low molecular agent serving as a chain-extending agent, wherein the hydroxyl-terminated polybutadiene has a molecular weight of 1000 to 2000 and the chain-extending agent has a chain-extending coefficient of 0.95 to 0.98;

wherein, the low polymerized polyol is dehydrated in a −0.095 to −0.098 Mpa vacuum atmosphere at 120 to 140° C. for 2 to 3 hours, cooled to 60° C. and mixed well with isocyanate in a −0.095 to −0.098 Mpa vacuum atmosphere at 70 to 80° C. for 1 to 2 hours until an isocyanate group content of 5.0 to 6.0% percent of the total polyurethane pre-polymer is achieved to form the polyurethane pre-polymer;

improving the polyurethane pre-polymer, wherein the polyurethane pre-polymer is modified by surface-treated nano-$TiO_2$ particles; the nano-$TiO_2$ particles of 10 to 40 nm in diameter are heating and mixed well with an ethanol solution containing a silane coupling agent to form a mixture; the mixture is heated to 220 to 240° C. and dried for 4 to 6 hours under a −0.095 to −0.098 Mpa vacuum atmosphere in a vacuum drier to become a solid; the solid is cooled and pulverized to obtain surface-treated nano-SiO$_2$ particles; the surface-treated nano-SiO$_2$ particles are dispersed in the polyurethane pre-polymer to obtain a modified polyurethane pre-polymer; wherein the nano-SiO$_2$ is 1 to 3 wt % based on the weight of the polyurethane pre-polymer; the silane coupling agent is 30 to 50 wt % based on the weight of nano-SiO$_2$ particles; and the ethanol solution is 3 to 5 times of the silane coupling agent; and applying the modified polyurethane pre-polymer to the outer surface of the internal rubber body to mold the polyurethane tread, wherein the modified polyurethane pre-polymer is heated to 70 to 82° C. in a −0.095 to −0.098 Mpa vacuum atmosphere, held still for 15 to 30 minutes to eliminate bubbles and then mixed well with the low molecular diol of chain-extending agent; wherein, amounts of the modified polyurethane pre-polymer and the chain-extending agent are calculated by setting the chain-extending coefficient and the isocyanate group content in accordance with the following formula:

$$QCE = WPP \times IGC \times CtCE \times CtCE,$$

wherein, QCE is an amount of chain-extending agent; WPP is a weight of the polyurethane pre-polymer; IGC is the isocyanate group content; CtCE is a constant of the chain-extending agent; and CoCE is the coefficient of the chain-extending agent; wherein, the internal rubber body is placed into a mold pre-heated to 110 to 130° C.; calculated amounts of the modified polyurethane pre-polymer and the chain-extending agent were poured into the mold, thereby, the polyurethane tread is formed on the outer surface of the internal rubber body; wherein, the mold is kept at a pressure of 0.2-0.3 Mpa and a temperature of 110 to 130° C.;

wherein the internal rubber body coated with the polyurethane tread is detached from the mold after 30 to 80 minutes and heated at 110 to 130° C. for 12 to 24 hours to obtain a composite rubber tire with a polyurethane tread.

2. A method for manufacturing composite rubber tire with a polyurethane tread, the method comprising acts of:

treating an outer surface of an internal rubber body, wherein the internal rubber body is coated with an isocyanate surfactant on the outer surface of the internal rubber body 1.5 to 12 hours before application of the polyurethane tread; and the internal rubber body is trimmed at surfaces to be coated with the polyurethane tread;

preparing a polyurethane pre-polymer, wherein the polyurethane pre-polymer is made from a low polymerized polyol and isocyanate system selected from system A or system B, wherein system A is a polytetramethylene glycol and 1,5-naphalene diisocyanate system and has a low molecular agent serving as a chain extending agent, wherein, the polytetramethylene glycol has a molecular weight of 1000 to 3000 and the chain-extending agent has a chain-extending coefficient of 0.95 to 0.98; and system B is a hydroxyl-terminated polybutadiene and 4,4'-diphenylmethane diisocyanate system and has a low molecular agent serving as a chain extending agent, wherein the hydroxyl-terminated polybutadiene has a molecular weight of 1000 to 2000 and the chain-extending agent has a chain-extending coefficient of 0.95 to 0.98;

wherein, the low polymerized polyol is dehydrated in a −0.095 to −0.098 Mpa vacuum atmosphere at 120 to 140° C. for 2 to 3 hours, cooled to 60° C. and mixed well with isocyanate in a −0.095 to −0.098 Mpa vacuum atmosphere at 70 to 80° C. for 1 to 2 hours until an isocyanate group content is 5.0 to 6.0 percent of the total polyurethane pre-polymer to achieve the polyurethane pre-polymer;

improving the polyurethane pre-polymer, wherein the polyurethane pre-polymer is modified by surface-treated nano-TiO$_2$ particles; the nano-SiO$_2$ particles with a diameter of 10 to 40 nm are mixed well with an ethanol solution containing a silane coupling agent to form a mixture; the mixture is heated to 220 to 240° C. and dried for 4 to 6 hours under a −0.095 to −0.098 Mpa vacuum atmosphere in a vacuum drier to become a solid; the solid is cooled and pulverized to obtain surface-treated nano-TiO$_2$ particles; the surface-treated nano-TiO$_2$ particles are dispersed evenly in the polyurethane pre-polymer to obtain a modified polyurethane pre-polymer; wherein, the nano-TiO$_2$ is 1 to 3 wt % based on the weight of the polyurethane pre-polymer; the silane coupling agent is 30 to 50 wt % based on the weight of the nano-TiO$_2$ particles; and the ethanol solution is 3 to 5 times the silane coupling agent; and applying the modified polyurethane pre-polymer to the outer surface of the internal rubber body to mold the polyurethane tread, wherein the modified polyurethane pre-polymer is heated to 70 to 80° C. in a −0.095 to −0.098 Mpa vacuum atmosphere, held still for 15 to 30 minutes to eliminate bubbles and then mixed well with the low molecular diol; wherein, amounts of the modified polyurethane pre-polymer and the chain-extending agent are calculated by setting the chain-extending coefficient and the isocyanate group content in accordance with the following formula:

$$QCE = WPP \times IGC \times CtCE \times CtCE,$$

wherein, QCE is the amount of chain-extending agent; WPP is a weight of the polyurethane pre-polymer; IGC is the isocyanate group content; CtCE is a constant of the chain-extending agent; and CoCE is the coefficient of the chain-extending agent; wherein the internal rubber body is placed into a mold and pre-heated to 110 to 1300°C.; calculated amounts of the modified polyurethane pre-polymer and the chain-extending agent are poured into the mold, thereby, the polyurethane tread is formed on the outer surface of the internal rubber body; wherein, the mold is kept at a pressure of 0.2-0.3 Mpa and a temperature of 110 to 130° C.;

wherein the internal rubber body coated with the polyurethane tread is detached from the mold after 30 to 80 minutes and heated at 110 to 130° C. for 12 to 24 hours to obtain a composite rubber tire with a polyurethane tread.

3. A method for manufacturing composite rubber tire with a polyurethane tread, the method comprising acts of:

treating an outer surface of an internal rubber body, wherein the internal rubber body is coated with an isocyanate surfactant on the outer surface of the internal rubber body 1.5 to 12 hours before application of the polyurethane tread; and the internal rubber body is trimmed at surfaces to be coated with the polyurethane tread;

preparing a polyurethane pre-polymer, wherein the polyurethane pre-polymer is made from a low polymerized polyol and isocyanate system selected from system A or system B, wherein system A is a polytetramethylene glycol and 1,5-naphalene diisocyanate system and has a low molecular agent serving as a chain extending agent, wherein, the polytetramethylene glycol has a molecular weight of 1000 to 3000 and the chain-extending agent has a chain-extending coefficient of 0.95 to 0.98; and system B is a hydroxyl-terminated polybutadiene and 4,4'-diphenylmethane diisocyanate system and has a low molecular agent serving as a chain extending agent, wherein the hydroxyl-terminated polybutadiene has a molecular weight of 1000 to 2000 and the chain-extending agent has a chain-extending coefficient of 0.95 to 0.98;

wherein, the low polymerized polyol is dehydrated in a −0.095 to −0.098 Mpa vacuum atmosphere at 120 to 140° C. for 2 to 3 hours, cooled below 60°C. and mixed well with isocyanate in a −0.095 to −0.098 Mpa vacuum atmosphere at 70 to 80° C. for 1 to 2 hours until an isocyanate group content is 5.0 to 6.0 percent of the total polyurethane pre-polymer to achieve the polyurethane pre-polymer; improving the polyurethane pre-polymer, wherein the polyurethane pre-polymer is modified by surface-treated nano-particles of carbon white; the nano-particles of carbon white with a diameter of 10 to 40 nm are mixed well with a toluene solution containing polyisocyanate to form a mixture; the mixture is heated to 220 to 240° C. and dried for 4 to 6 hours under a −0.095 to −0.098 Mpa vacuum atmosphere in a vacuum drier to become a solid; the solid is cooled and pulverized to obtain surface-treated nano-particles of carbon white; the surface-treated nano-particles of carbon white are dispersed evenly in the polyurethane pre-polymer to obtain a modified polyurethane pre-polymer; wherein, the nano-particles of carbon white is 1 to 3 wt % based on the weight of the polyurethane pre-polymer; polyisocyanate is 50 to 60 wt % based on the weight of the nano-particles of carbon white; and the toluene solution is 3 to 5 times the polyisocyanate; and applying the modified polyurethane pre-polymer to the outer surface of the internal rubber body to mold the polyurethane tread, wherein the modified polyurethane pre-polymer is heated to 70 to 80° C. in a −0.095 to −0.098 Mpa vacuum atmosphere, held still for 15 to 30 minutes to eliminate bubbles and then mixed well with the low molecular diol; wherein, amounts of the modified polyurethane pre-polymer and the chain-extending agent are calculated by setting the chain-extending coefficient and the isocyanate group content in accordance with the following formula:

$$QCE = WPP \times IGC \times CtCE \times CtCE,$$

wherein, QCE is the amount of chain-extending agent;
WPP is a weight of the polyurethane pre-polymer;
IGC is the isocyanate group content;
CtCE is a constant of the chain-extending agent; and
CoCE is the coefficient of the chain-extending agent;

wherein, the internal rubber body is placed into a mold and pre-heated to 110 to 130° C.; calculated amounts of the modified polyurethane pre-polymer and the chain-extending agent are poured into the mold, thereby, the polyurethane tread is formed on the outer surface of the internal rubber body; wherein, the mold is kept at a pressure of 0.2-0.3 Mpa and a temperature of 110 to 130° C.;

wherein, the internal rubber body coated with the polyurethane tread is detached from the mold after 30 to 80 minutes and heated at 110 to 130° C. for 12 to 24 hours to obtain a composite rubber tire with a polyurethane tread.

4. A method for manufacturing composite rubber tire with a polyurethane tread, the method comprising acts of:

treating an outer surface of an internal rubber body, wherein the internal rubber body is coated with an intermediate glue layer on the outer surface of the internal rubber body when the internal rubber body is molded; the intermediate glue layer is vulcanized and trimmed at surfaces to be coated with the polyurethane tread;

preparing a polyurethane pre-polymer, wherein the polyurethane pre-polymer is made from a low polymerized polyol and isocyanate system selected from system A or system B, wherein system A is a polytetramethylene glycol and 1,5-naphalene diisocyanate system and has a low molecular agent serving as a chain extending agent, wherein, the polytetramethylene glycol has a molecular weight of 1000 to 3000 and the chain-extending agent has a chain-extending coefficient of 0.95 to 0.98; and system B is a hydroxyl-terminated polybutadiene and 4,4'-diphenylmethane diisocyanate system and has a low molecular agent serving as a chain extending agent, wherein the hydroxyl-terminated polybutadiene has a molecular weight of 1000 to 2000 and the chain-extending agent has a chain-extending coefficient of 0.95 to 0.98;

wherein, the low polymerized polyol is dehydrated in a −0.095 to −0.098 Mpa vacuum atmosphere at 120 to 140° C. for 2 to 3 hours, cooled below 60° C. and mixed well with isocyanate in a −0.095 to −0.098 Mpa vacuum atmosphere at 70 to 80° C. for 1 to 2 hours until an isocyanate group content is 5.0 to 6.0 percent of the total polyurethane pre-polymer to achieve the polyurethane pre-polymer; improving the polyurethane pre-polymer, wherein the polyurethane pre-polymer is modified by surface-treated nano-particles of carbon white; the nano-particles of carbon white with a diameter 10 to 40 nm are mixed well with a toluene solution containing polyisocyanate to form a mixture; the mixture is heated to 220 to 240° C. and dried for 4 to 6 hours under a −0.095 to −0.098 Mpa vacuum atmosphere in a vacuum drier to become a solid; the solid is cooled and pulverized to obtain surface-treated nano-particles of carbon white; the surface-treated nano-particles of carbon white are dispersed in the polyurethane pre-polymer to obtain a modified polyurethane pre-polymer; wherein, the nano-particles of carbon white is 1 to 3 wt % based on the weight of the polyurethane pre-polymer; the polyisocyanate is 50 to 60 wt % based on the weight of nano-particles of carbon white; and the toluene solution is 3 to 5 times the polyisocyanate; and applying the modified polyurethane pre-polymer to the outer surface of the internal rubber body to mold the polyurethane tread, wherein the modified polyurethane pre-polymer is heated to 70 to 82° C. in a −0.095 to −0.098 Mpa vacuum atmosphere, held still for 15 to 30 minutes to eliminate bubbles and then mixed well with the low molecular diol of the chain-extending agent; wherein, amounts of the modified polyurethane pre-polymer and the chain-extending agent are calculated by setting the chain-extending coefficient and the isocyanate group content in accordance with the following formula:

$$QCE = WPP \times IGC \times CtCE \times CtCE,$$

wherein, QCE is the amount of chain-extending agent;
WPP is a weight of the polyurethane pre-polymer;
IGC is the isocyanate group content;
CtCE is a constant of the chain-extending agent; and
CoCE is the coefficient of the chain-extending agent;
wherein, the internal rubber body is placed into a mold and pre-heated to 110 to 130° C.; calculated amounts of the modified polyurethane pre-polymer and the chain-extending agent are poured into the mold, thereby, the polyurethane tread is formed on the outer surface of the internal rubber body; wherein, the mold is kept at a pressure of 0.2-0.3 Mpa and a temperature of 110 to 130° C.;
wherein, the internal rubber body coated with the polyurethane tread is detached from the mold after 30 to 80 minutes and heated at 110 to 130° C. for 12 to 24 hours to obtain a composite rubber tire with a polyurethane tread.

5. The method as claimed in claim 3, wherein the nanoparticles of carbon white have a diameter of 15 to 25 nm.

6. The method as claimed in claim 4, wherein the nanoparticles of carbon white have a diameter of 15 to 25 nm.

7. The method as claimed in claim 1, wherein the low molecular diol is selected from the group consisting of glycol, 1,4-butylene diol and hydroquinone-bi (β-hydroxylethyl) ether.

8. The method as claimed in claim 2, wherein the low molecular diol is selected from the group consisting of glycol, 1,4-butylene diol, and hydroquinone-bi (β-hydroxylethyl) ether.

9. The method as claimed in claim 3, wherein the low molecular diol is selected from the group consisting of glycol, 1,4-butylene diol, and hydroquinone-bi (β-hydroxylethyl) ether.

10. The method as claimed in claim 4, wherein the low molecular diol is selected from the group consisting of glycol, 1,4-butylene diol, and hydroquinone-bi (β-hydroxylethyl) ether.

* * * * *